United States Patent [19]

Suzaki et al.

[11] 4,039,919
[45] Aug. 2, 1977

[54] MULTI-PHASE MOTOR CONTROLLER

[75] Inventors: Masayuki Suzaki; Shigeyuki Araki, both of Tokyo, Japan

[73] Assignee: Ricoh Co., Ltd., Tokyo, Japan

[21] Appl. No.: 583,945

[22] Filed: June 4, 1975

[30] Foreign Application Priority Data

June 6, 1974    Japan .................................. 49-63448

[51] Int. Cl.² ........................................... H02K 37/00
[52] U.S. Cl. ..................................... 318/696; 318/313
[58] Field of Search ....................... 318/313, 685, 696

[56] References Cited

U.S. PATENT DOCUMENTS

| 3,374,410 | 3/1968 | Cronquist et al. | 318/685 |
| 3,414,786 | 12/1968 | Kasmer et al. | 318/685 X |
| 3,766,458 | 10/1973 | Nishimura et al. | 318/313 |
| 3,863,118 | 1/1975 | Lander et al. | 318/685 |
| 3,898,545 | 8/1975 | Coppa et al. | 318/313 |

Primary Examiner—Gene Z. Rubinson
Attorney, Agent, or Firm—Frank J. Jordan

[57] ABSTRACT

A disc rotatable with the motor shaft has circumferentially equally spaced slots formed therethrough. A light source and receiver assembly are operatively arranged relative to the slots to produce pulses representing a predetermined angular displacement of the motor shaft determined by the width of the slots as the motor shaft rotates. The duration of the pulses decreases as the motor shaft speed increases. A multivibrator is triggered by the leading edges of the pulses to generate reference pulses of a predetermined duration. The motor phases are excited in a normal sequence as long as the duration of the pulses is longer than the duration of the reference pulses. When the pulse duration becomes less than the reference pulse duration, coincidence sensing means alter the phase excitation during the times between the termination of the pulses and the termination of the respective reference pulses to apply a torque to the motor shaft in such a manner as to prevent the motor shaft from accelerating further. The torque may be a low positive torque which is insufficient to overcome the frictional forces in the motor control system, a zero torque produced by de-energizing all of the motor phases or a reverse torque. The result is that the motor shaft speed is prevented from exceeding a predetermined value.

15 Claims, 10 Drawing Figures

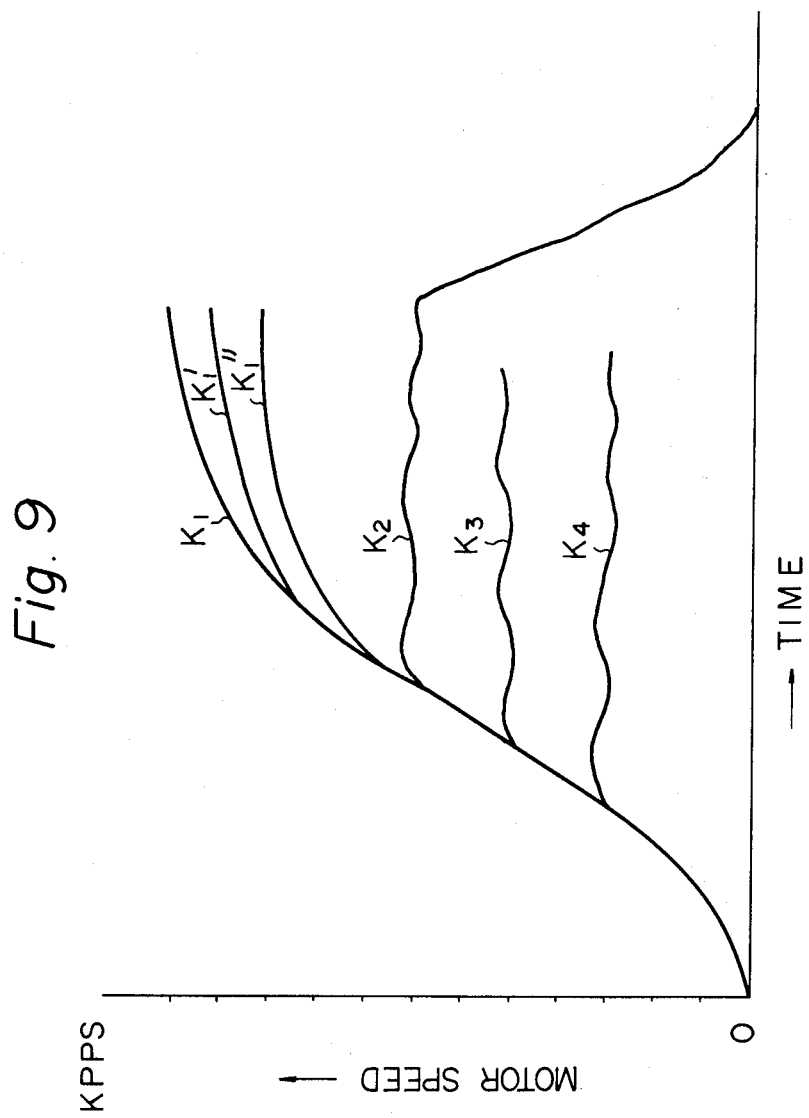

MULTI-PHASE MOTOR CONTROLLER

The present invention relates to an improved method of driving a multi-phase stepping motor and a motor controller embodying the method.

Closed loop driving control methods and systems are known in the prior art for multi-phase stepping motors. This configuration provides accurate stopping of the motor at a desired step position and reduces hunting to a low level. The operation of such a system is therefore quite stable, and the motor may be driven at high rates of speed and acceleration. The range of applications of such a motor system is much greater than with an open loop stepping motor system.

Stepping motors, also called pulse motors, are becoming increasingly employed in industrial applications due to the introduction of digital pulse techniques. A stepping motor can produce an angular output which is proportional to the number of input pulses from a command device, and can also produce a rotational speed output which is proportional to the frequency of input pulses. Stepping motors are found in such applications as copy machine paper drives, printers, etc.

However, stepping motor control systems known in the prior art are disadvantageous in that the motor shafts, due to the inherent nature of an open loop control system, tend to oscillate in response to each input pulse. This phenomenon is particularly troublesome if the frequency of the input pulses is high and/or the frequency of the input pulses is close to the oscillatory frequency of the motor shaft in response to the input pulses. Similarly, this phenomenon, known as hunting, can occur at the stopping position of the motor shaft to ruin the stability of the motor.

In addition, it has been very difficult to smoothly damp the stepping motor when the friction and output loads on the motor shaft vary using purely electrical means. For this reason, prior art stepping motors utilize magnetic brakes or other means to provide smoother damping. Other problems in the prior art involve the durability, operational noise and reliability of stepping motors.

A partial solution to this problem is disclosed in a U.S. patent application by the present applicants having the Ser. No. 525,132 and filed on Nov. 19, 1974. Said application discloses a method of controllably decelerating the motor shaft to a stop by applying reverse torque to the motor shaft for a length of time proportional to the motor shaft speed. While this method is practical and effective, it has been found in practice that if the motor shaft speed becomes excessively high at random due to the variations in the load conditions of the stepping motor, variations in the characteristics of the stepping motor, etc., an excessive amount of power is required to decelerate it to a stop in the required short period of time. It is therefore advantageous to limit the motor shaft speed to a predetermined value below which the shaft can be quickly decelerated to a stop using a reasonable amount of power.

It is therefore an important object of the present invention to provide a method of limiting the speed of a multi-phase motor shaft to a predetermined value.

It is another object of the present invention to provide a multi-phase motor controller embodying the above method.

The above and other objects, features and advantages of the present invention will become apparent from the following detailed description taken with the accompanying drawings.

FIG. 2 is a timing chart of the embodiment of the controller shown in FIG. 1a;

FIG. 9 is a graph illustrating the operation of the present invention.

Figure 1A:
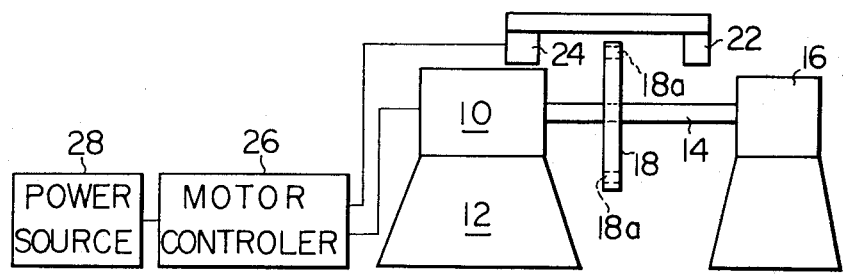
FIG. 1a is a longitudinal plan view of a four phase stepping motor, a load and a motor controller embodying the invention.
Figure 1B:
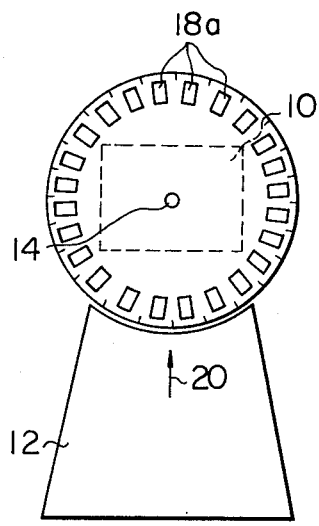
FIG. 1b is an elevational plan view of the motor shown in FIG. 1 and a disc mounted on the motor shaft.

Referring now to FIG. 1a, a 24 step, 4 phase stepping motor 10 of variable reluctance type is shown as mounted on a base 12. A motor shaft 14 of the motor 10 is connected to drive a load 16, which may be any suitable device. A disc 18 is mounted for rotation with the shaft 14, and is formed with 24 circumferentially equally spaced slots 18a. Each slot 18a is arranged halfway between two respective step positions of the motor shaft 14 as illustrated in FIG. 1b and indicated by an arrow mark 20 on the base 12.

A light source 22 and receiver 24 are mounted on top of the motor 10 at a distance from the center of the shaft 14 equal to the distance from the center of the shaft 14 to the center of the slots 18a of the disc 18. In operation, the receiver 24 produces an output signal or pulse B as the shaft 14 rotates each time a slot 18a passes between the source 22 and receiver 24.

A motor controller 26 embodying the present invention is connected to the receiver 24 to receive the pulses B, to a power source 28 and to the motor 10 to control the same.

Figure 3:
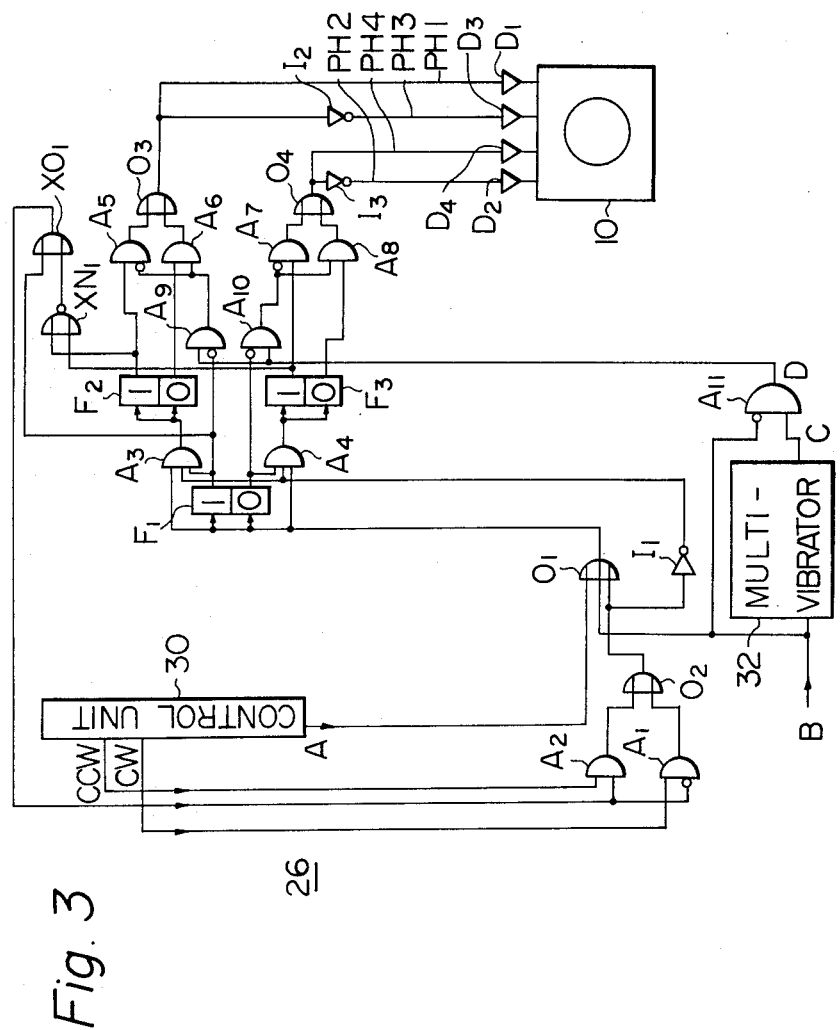
FIG. 3 is an electrical schematic diagram of the controller for producing the signals shown in FIG. 2.

A first embodiment of the controller 26 is shown in FIG. 3, and comprises a control unit 30 having a start pulse A output connected to an input of an OR gate 01 and CW and CCW pulse outputs connected to inputs of AND gates A1 and A2 respectively. The outputs of the AND gates A1 and A2 are connected to inputs of an OR gate 02, the output of which is connected to another input of the OR gate 01. The output of the OR gate 01 is connected to trigger inputs of the 1 and 0 side stages of a flip-flop F1 and also to inputs of AND gates A3 and A4. The output of the OR gate 02 is connected through an inverter I1 to other inputs of the AND gates A3 and A4. The outputs of the 1 and 0 stages of the flip-flop F1 are connected to inputs of the AND gates A3 and A4 respectively. The outputs of the AND gates A3 and A4 are connected to trigger inputs of flip-flops F2 and F3 respectively. The 1 side outputs of the flip-flops F2 and F3 are connected to inputs of an exclusive NOR gate XN1, the output of which is connected to an input of an exclusive OR gate XO1. The 1 side output of the flip-flop F1 is connected to another input of the exclusive OR gate XO1, the output of which is connected to an input of the AND gate A2 and to an inverting input of the AND gate A1.

The 1 and 0 side outputs of the flip-flop F2 are connected to inputs of AND gates A5 and A6, respectively, the outputs of which are connected to inputs of an OR gate 03. The 1 and 0 side outputs of the flip-flop F3 are connected to inputs of AND gates A7 and A8 respectively, the outputs of which are connected to inputs of an OR gate 04. The output of the OR gate 03 is connected through a line designated as PH1 and representing the phase 1 excitation of the motor 10 and through a driver D1 to the phase 1 input (not designated) of the motor 10. The output of the OR gate 03 is also connected through an inverter I2, a line designated as PH3 and representing the phase 3 excitation of the motor 10 and a driver D3 to the phase 3 input (not designated) of the motor 10.

The output of the OR gate 04 is connected through a line PH4 representing the phase 4 excitation of the motor 10 and a driver D4 to the phase 4 input (not designated) of the motor 10. The output of the OR gate 04 is also connected through an inverter I3, a line designated as PH2 and representing the phase 2 excitation of the motor 10 and a driver D2 to the phase 2 input (not designated) of the motor 10. The 1 side output of the flip-flop F1 is connected to an inverting input of an AND gate A9, the output of which is connected to an inverting input of the AND gate A5 and directly to an input of the AND gate A6. The 0 side output of the flip-flop F1 is connected to an inverting input of an AND gate A10, the output of which is connected to an inverting input of the AND gate A7 and directly to an input of the AND gate A8.

The pulses B from the receiver 24 are applied to inputs of the OR gate 01, an inverting input of an AND gate A11 and an input of a monostable multivibrator 32. The multivibrator 32 produces pulses C of predetermined duration in response to the leading edges of the pulses B which are fed to another input of the AND gate A11. The output of the AND gate A11 is connected to inputs of the AND gate A9 and A10.

It is to be appreciated that the multivibrator 32 may be replaced by any suitable means which operates and functions essentially similarly to the multivibrator 32.

The operations of selecting the desired direction of rotation of the motor shaft 14 and sequentially exciting the motor phases for normal rotation which are common to all of the embodiments will now be described with reference to the following table. For simplicity of explanation, it will be assumed that the output of the AND gate A11 is low or 0 so that the AND gates A9, A10, A6 and A8 are inhibited and the AND gates A5 and A7 are enabled so that the output of the 1 side of the flip-flop F2 may be considered as directly connected to the line PH1 and to the input of the inverter I2. Similarly, the 1 side output of the flop-flop F3 can be considered as directly connected to the line PH4 and to the input of the inverter I3.

TABLE

In the table, the motor phases are those normally excited with the flip-flops F1, F2 and F3 in specified states. The rotation directions designated CW (clockwise) and CCW (counterclockwise) are those which will result if pulses are applied through the OR gate 01 with the flip-flops F1, F2 and F3 in the specified states shown. The flip-flop F1, F2 and F3 outputs are those of the 1 sides. It will be noticed that each of the eight possible combinations of the states of the flip-flops F1, F2 and F3 designates a specific one of the eight possible combinations of motor phase excitation states and rotation directions, with no duplications or omissions. It will also be noticed that the outputs of the flip-flops F2 and F3 designate the excited motor phases whereas the output of the flip-flop F1 designates the direction of rotation. For example, with phases 1-2 excited, the outputs of the flip-flops F2 and F3 are high and low respectively. However, in the case of an applied pulse producing clockwise rotation, the output of the flip-flop F1 is high whereas in the counterclockwise case the output of the flip-flop F1 is low.

It will also be noticed that in all of the clockwise cases, if the output of the flip-flop F1 is high, the outputs of the flip-flops F2 and F3 are different (one of the outputs of the flip-flops F2 and F3 is high whereas the other is low). In the clockwise case, if the output of the flip-flop F1 is low, the outputs of the flip-flops F2 and F3 are the same (both high or both low).

In all counterclockwise cases, these relations are reversed. If the output of the flip-flop F1 is high, the outputs of the flip-flops F2 and F3 are the same, whereas if the output of the flip-flop F1 is low, the outputs of the flip-flops F2 and F3 are different. These relationships make it possible to determine if the status of the flip-flops F1, F2 and F3 designates clockwise or counterclockwise rotation.

The exclusive NOR gate XN1 will produce a high output if the outputs of the flip-flops F2 and F3 are the same, and a low output if they are different. The exclusive OR gate XO1 will produce a high output if the output of the flip-flop F1 and the output of the exclusive NOR gate XN1 are different, and a low output if they are the same. As shown in the table, the output of the exclusive OR gate XO1 will be high in all cases in which the status of the flip-flops F1, F2 and F3 designates clockwise rotation, and low in all cases of counterclockwise rotation.

In operation, it is desired to rotate the motor shaft 14 in a desired clockwise or counterclockwise direction by one step from an initial position in response to the pulse A, and a clockwise or counterclockwise pulse CW or CCW is generated by the control unit 30 followed by generating the pulse A.

Assuming that the flip-flops F1, F2 and F3 are in a clockwise status, the high output of the exclusive OR gate XO1 is applied to the input of the AND gate A2 and to the inverting input of the AND gate A1 thereby enabling the AND gate A2 and inhibiting the AND gate A1. If it is desired to rotate the shaft 14 in the clockwise direction, the clockwise pulse CW is fed from the step control unit 30 to the input of the AND gate A1. However, since the AND gate A1 is inhibited, the pulse CW has no effect on the flip-flops F1, F2 and F3. This is the desired result, since because the flip-flops F1, F2 and F3 are already in a clockwise status, and it is not desired to change them. If, however, the flip-flops F1,

| Excited motor Phases | Rotation direction | F1 output | F2 output | F3 output | XN1 output | XO1 output |
|---|---|---|---|---|---|---|
| 1-2 | CW | high | high | low | low | high |
| 2-3 | CW | low | low | low | high | high |
| 3-4 | CW | high | low | high | low | high |
| 4-1 | CW | low | high | high | high | high |
| 1-2 | CCW | low | high | low | low | low |
| 2-3 | CCW | high | low | low | high | low |
| 3-4 | CCW | low | low | high | low | low |
| 4-1 | CCW | high | high | high | high | low |

F2 and F3 are in a counterclockwise status, the output of the exclusive OR gate XO1 is low and is inverted by the inverting input of the AND gate A1 to enable the AND A1. In this case, the pulse CW is gated through the AND gate A1 and OR gates 02 and 01 to the trigger inputs of the flip-flop F1 to change the status from counterclockwise to clockwise. The AND gate A2 will similarly gate a counterclockwise pulse CCW therethrough if the flip-flops F1, F2 and F3 are in a clockwise status and block a pulse CCW if the flip-flops F1, F2 and F3 are already in a counterclockwise status. Since the CW or CCW pulse gated to the inputs of the AND gates A3 and A4 is also inverted by the inverter I1 and applied to other inputs of the AND gates A3 and A4, the AND gates A3 and A4 will be inhibited and the CW or CCW pulse will trigger only the flip-flop F1 to change the direction of retation. The output of the inverter I1 is high at all other times to enable the AND gates A3 and A4.

Counterclockwise rotation of the motor shaft 14 will now be described. It will be assumed that the initial outputs of the flip-flops F1, F2 and F3 are low, high and low respectively, designating phases 1-2 and counterclockwise rotation as shown in the table. In response to the pulse A, only the flip-flops F1 and F3 change state since the AND gate A3 is inhibited by the low 1 side output of the flip-flop F2 so that the outputs of the flip-flops F1, F2 and F3 become all high designating phases 4-1 and counterclockwise rotation. In response to the first pulse B, the flip-flops F1 and F2 change state so that the outputs of the flip-flops F1, F2 and F3 become low, low and high respectively to designate phases 3-4 and counterclockwise rotation. In response to the second pulse B, the flip-flops F1 and F3 change state so that the outputs of the flip-flops F1, F2 and F3 become high, low and low respectively designating phases 2-3 and counterclockwise rotation. In response to the third pulse B, the flip-flops F1 and F2 change state so that the outputs of the flip-flops F1, F2 and F3 become low, high and low respectively designating phases 1-2 and counterclockwise rotation. Application of additional pulses B will produce identical results to those just described. Clockwise rotation is produced in an essentially similar manner by simply applying pulses B with the flip-flops F1, F2 and F3 in the clockwise mode. The main operating principle is that only the flip-flop F2 will be changed when the 1 side output of the flip-flop F1 is high and only the flip-flop F3 will be changed when the 0 side output of the flip-flop F1 is high.

Figure 2:
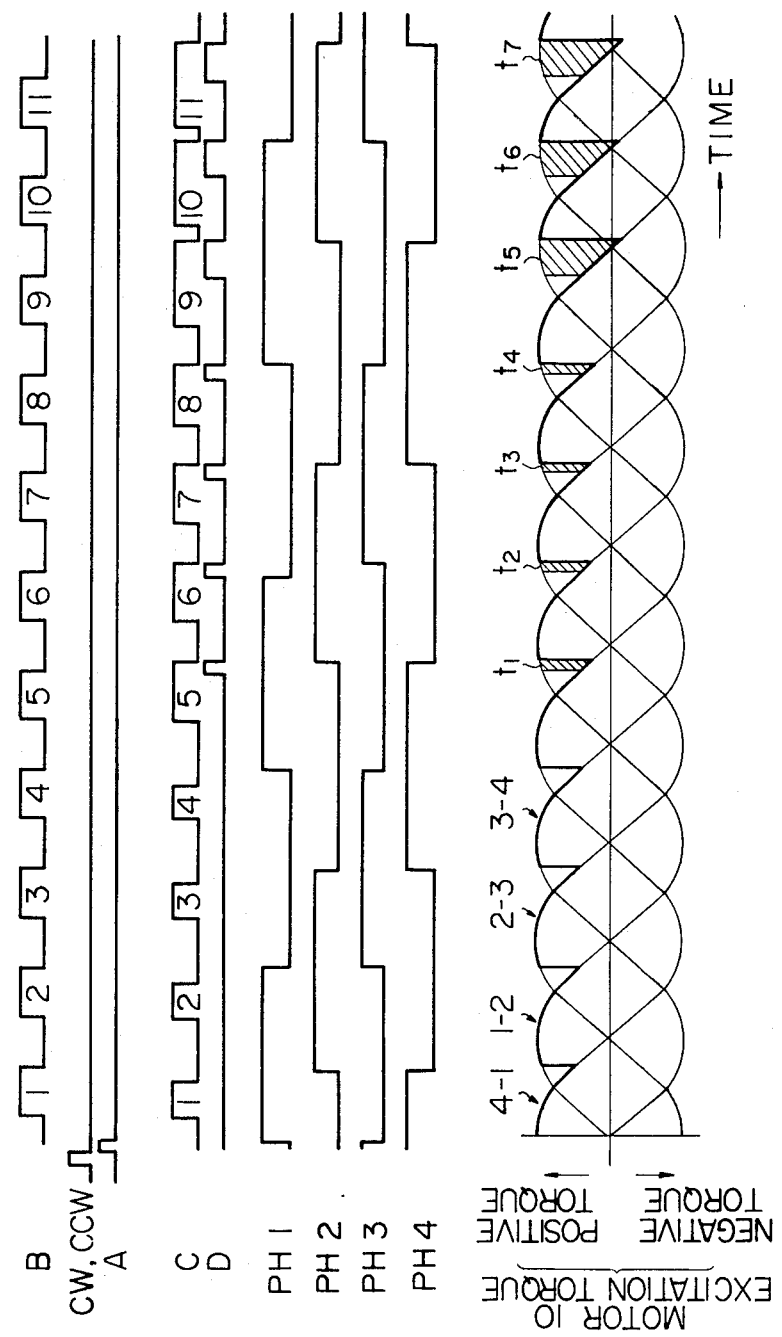

Referring also to FIG. 2, it will be understood that each pulse B represents a predetermined angular displacement of the motor shaft 14 and that the pulse width or duration will decrease as the shaft 14 speed increases. The flip-flops F1, F2 and F3 are triggered by the trailing edges of pulses A, B, CW and CCW. It will be assumed for exemplary purposes that the selected direction of rotation is clockwise and the initial phases are 3-4. The pulse A is gated through the OR gate 01 to the flip-flops F1, F2 and F3 which causes the flip-flop F2 to change and designate phases 4-1. The downclocks of the 1st to 4th pulses B will actuate the flip-flops F1, F2 and F3 to designate phases 1-2, 2-3, 3-4 and 4-1 in the manner described above.

The upclocks of the pulses B trigger the multivibrator 32 which produces the pulses C, each of which has a predetermined duration. Although in FIG. 2 the widths of the pulses C are shown to increase with time, this is only for simplicity of illustration. The widths or durations of the pulses C are actually all equal. Similarly, the widths or durations of the pulses B are shown as equal with respect to time for simplicity of illustration. Actually the widths or durations of the pulses B decrease with time since the motor shaft 14 accelerates. It will be clearly understood that the durations of the pulses B decrease relative to the durations of the pulses C which are constant as a function of time as the motor shaft 14 accelerates.

The pulses B and C are applied to inverting and noninverting inputs of the AND gate A11 so that the AND gate A11 will produce a high output only when a pulse C is present and a pulse B is not present.

The duration of the pulses C is selected to be equal to the duration of the pulses B at a motor shaft 14 speed which is a selected predetermined value and is lower than the maximum permissible motor shaft 14 speed. During the time the first four pulses B are produced the motor shaft 14 speed is below the predetermined value.

Examination of the logical function of the AND gate A11 will disclose that the AND gate A-1 will only produce a high output when a pulse C is present and a pulse B is not present. Since the pulses B and C are generated at the same time, this condition can only occur when the duration of a pulse B is shorter than the duration of a pulse C. The AND gate A11 will produce a high output designated as a pulse D during the time duration between the termination of a pulse B and the termination of a pulse C when the duration of the pulse B is shorter than the duration of the pulse C. The pulses D are applied to the inputs of the AND gates A9 and A10 to enable the same.

In response to the downclock of the 4th pulse B, the 1 side outputs of the flip-flops F1, F2 and F3 are low, high and high respectively designating phases 4-1. In response to the 5th pulse B, the 1 side outputs of the flip-flops F1, F2 and F3 will become high, high and low respectively designating phases 1-2. However, it will be seen that the duration of the 5th pulse B is shorter than the duration of the 5th pulse C, and the AND gate A11 will produce a pulse D having a duration equal to the difference therebetween and beginning with the downclock of the pulse B. This pulse D enables the AND gates A9 and A10. Since the 1 side output of the flip-flop F1 is high, the AND gate A0 will produce a low output which will have no effect on the AND gates A5 and A6. The high output of the flip-flop F2 will continue to be applied through the AND gate A5 and the OR gate 03 to excite phase 1. The low 0 side output of the flip-flop F1 will, however, be inverted by the inverting input of the AND gate A10 which will feed a high output to the AND gates A7 and A8. This will inhibit the AND gate A7 and enable the AND gate A8 so that the high 0 side output of the flip-flop F3 will be gated through the AND gate A8 and OR gate 04 to excite phase 4. The phase excitation is altered in this manner to 4-1 which constitutes one backward step in the phase excitation sequence. As shown in FIG. 2 by a solid thick curve representing the motor 10 excitation torque and a hatched portion t1 representing the alteration of the motor 10 excitation, a backward step in the excitation sequence results in a reduction of the torque applied to the motor 10 during the time t1.

The AND gates A9 and A10 act as sensors to detect which of the flip-flops F2 and F3 was changed last for the purpose of reversing the phase excitation sequence by one step during the times the AND gate A11 produces pulses D. A low output of the 1 side or the 0 side of the flip-flop F1 indicates that the flip-flop F2 or F3 respectively was changed last. The AND gates A6 and A7 serve to produce one backward sequence step by inverting the output of the flip-flop F2 or F3 which was last changed to duplicate the previous phase sequence excitation. This process is operable for all clockwise and counterclockwise phase excitations as can be verified by studying the table.

Reference to FIG. 2 will further disclose that as the motor shaft 14 speed increases and the durations of the pulses B further decrease relative to the durations of the pulses C, the durations of the pulses D will increase as shown at t2 to t7. During the times t5 to t7, the motor 10 excitation torque will actually go negative. The width of the pulses C is selected in accordance with the power of the motor 10, the friction, load resistance and other practical design factors so that the effect of reducing the accelerating force on the motor shaft 14 as shown at t1 to t7 results in limiting the motor shaft 14 speed to the desired maximum permissible value.

Figure 4:
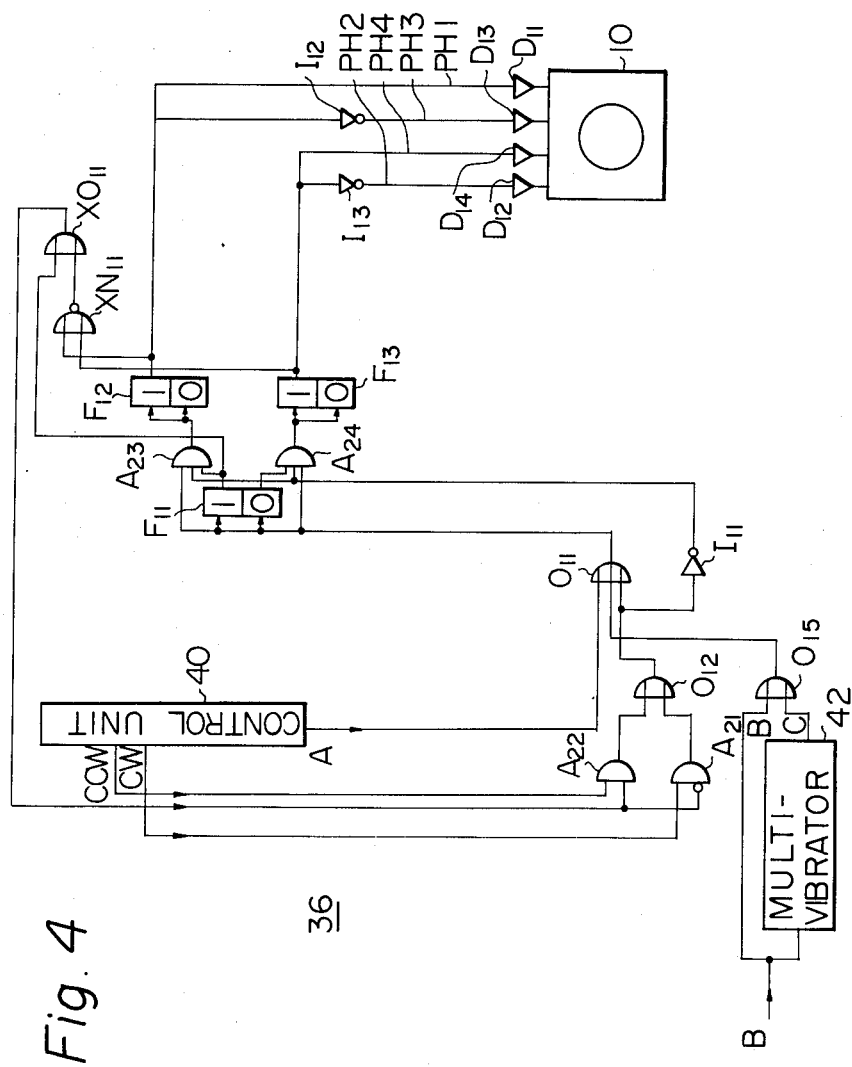
FIG. 4 is an electrical schematic diagram of another controller for producing the signals shown in FIG. 2.

A second embodiment of the controller 26 designated as 36 is shown in FIG. 4, and comprises a control unit 40 having a start pulse A output connected to an input of an OR gate 011 and CW and CCW pulse outputs connected to inputs of AND gates A21 and A22 respectively. The outputs of the AND gates A21 and A22 are connected to inputs of an OR gate 012, the output of which is connected to another input of the OR gate 011. The output of the OR gate 011 is connected to trigger inputs of the 1 and 0 side stages of a flip-flop F11 and also to inputs of AND gates A23 and A24. The output of the OR gate 012 is connected through an inverter I11 to other inputs of the AND gates A23 and A24. The outputs of the 1 and 0 stages of the flip-flop F11 are connected to inputs of the AND gates A23 and A24 respectively. The outputs of the AND gates A23 and A24 are connected to trigger inputs of flip-flops F12 and F13 respectively. The 1 side outputs of the flip-flops F12 and F13 are connected to inputs of an exclusive NOR gate XN11, the output of which is connected to an input of an exclusive OR gate XO11. The 1 side output of the flip-flop F1 connected to another input of the exclusive OR gate XO11, the output of which is connected to an input of the AND gate A22 and to an inverting input of the AND gate A21.

The 1 side output of the flip-flop F12 is connected through the line PH1 and a driver D11 to the phase 1 input of the motor 10 and through an inverter I2, the line PH3 and a driver D13 to the phase 3 input of the motor 10.

The 1 side output of the flip-flop F13 is connected through the line PH4 and a driver D14 to the phase 4 input of the motor 10 and through an inverter I13, the line PH2 and a driver D12 to the phase 2 input of the motor 10.

The pulses B are applied to the input of a multivibrator 42 similar to the multivibrator 32 and to the input of an OR gate 015. The output pulses C of the multivibrator 42 are applied to another input of the OR gate 015. The output of the OR gate 015 is applied to an input of the OR gate O11.

The operation of the embodiment shown in FIG. 4 is identical to the embodiment shown in FIG. 3 as long as the duration of the pulses B is longer than the duration of the pulses C. In other words, the OR gate 015 will gate the pulses B therethrough without modification since the OR gate 015 will produce a high output when either or both of the pulses B and C are present and the pulses B are longer than the pulses C. When, however, the motor shaft 14 speed increases to the point where the pulses B become shorter than the pulses C, the signals gated through the OR gate 015 will correspond in time to the pulses C rather than the pulses B since the pulses C are longer. The flip-flops F11, F12 and F13 will therefore be triggered by the downclocks of the pulses C rather than the downclocks of the pulses B. The effect is identical to that of the embodiment of FIG. 3 regarding the excitation of the motor phases. It will be noted that the pulses D are not utilized in the embodiment of FIG. 4. Whereas in the embodiment of FIG. 3 the motor phases are switched backwards by one step during the time interval between the downclocks of the pulses B and C by inverting the outputs of one of the flip-flops F2 and F3, the identical effect is produced by the embodiment of FIG. 4 by delaying the changing of the motor phases until the downclocks of the pulses C. The accelerating force applied to the motor shaft 14 is thereby reduced to slow down the motor shaft 14 and limit the speed of the motor shaft 14 to the predetermined maximum permissible value.

Figure 6:
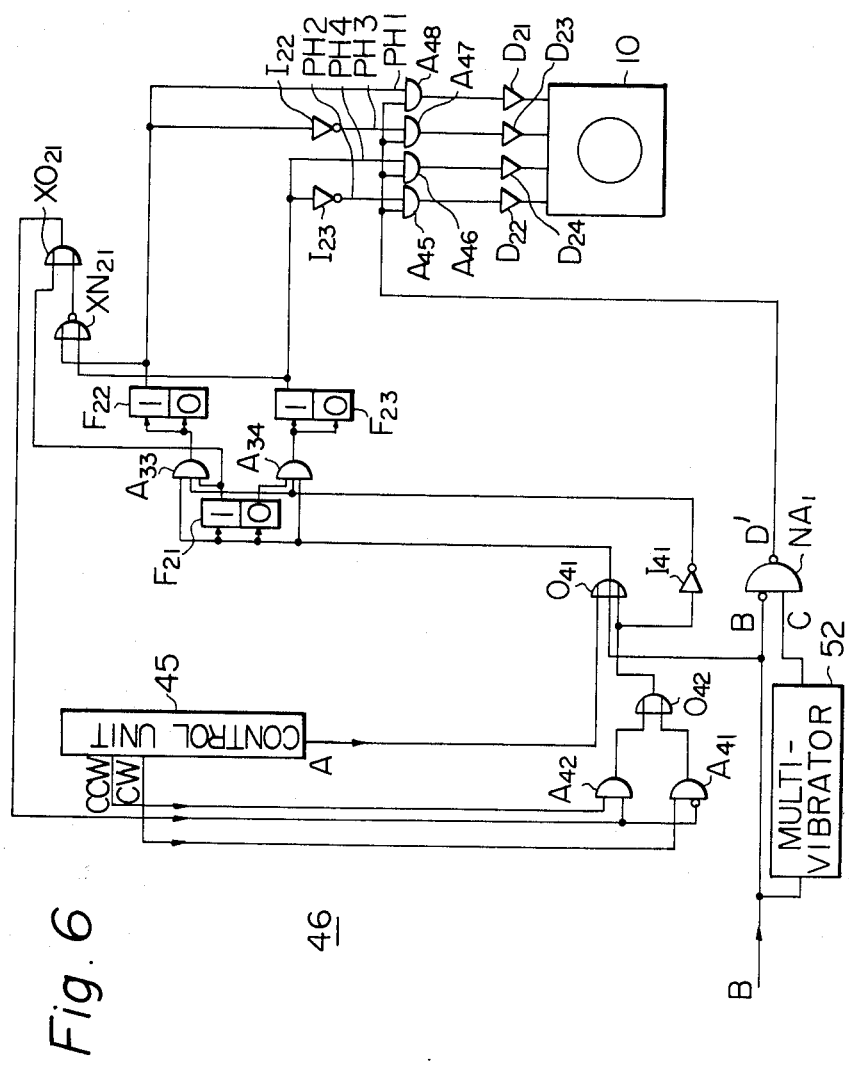
FIG. 6 is an electrical schematic diagram of a controller for producing the signals shown in FIG. 5.

A third embodiment of the controller 26 designated as 46, is shown in FIG. 6, and comprises a control unit 45 having a start pulse A output connected to an input of an OR gate 041 and CW and CCW pulse outputs connected to inputs of AND gates A41 and A42 respectively. The outputs of the AND gates A41 and A42 are connected to inputs of an OR gate 042, the output of which is connected to another input of the OR gate 041. The output of the OR gate 041 is connected to trigger inputs of the 1 and 0 side stages of a flip-flop F21 and also to inputs of AND gates A33 and A34. The output of the OR gate 042 is connected through an inverter I41 to other inputs of the AND gates A33 and A34. The outputs of the 1 and 0 stages of the flip-flop F21 are connected to inputs of the AND gates A33 and A34 respectively. The outputs of the AND gates A33 and A34 are connected to trigger inputs of flip-flops F22 and F23 respectively. The 1 side outputs of the flip-flops F22 and F23 are connected to inputs of an exclusive NOR gate XN21, the output of which is connected to an input of an exclusive OR gate XO21. The 1 output of the flip-flop F21 is connected to another input of the exclusive OR gate XO21, the output of which is connected to an input of the AND gate A42 and to an inverting input of the AND gate A41.

The 1 side output of the flip-flop F22 is connected through the line PH1 to an input of an AND gate A48 and through an inverter I22 and the line PH3 to an input of an AND gate A47. The output of the AND gate 48 is connected through a driver D21 to the phase 1 input of the motor 10, and the output of the AND A47 is connected through a driver D23 to the phase 3 input of the motor 10.

The 1 side output of the flip-flop F23 is connected through the line PH4 to an input of an AND gate A46 and through an inverter I23 and the line PH2 to an input of an AND gate A45. The output of the AND gate A46 is connected through a driver D24 to the phase 4 input of the motor 10, and the output of the AND gate A45 is connected through a driver D22 to the phase 2 input of the motor 10.

The pulses B are applied to inputs of the OR gate 041, a multivibrator 52 adapted to produce the pulses C and to an inverting input of a NAND gate NA1. The output of the multivibrator 52 is applied to another input of the NAND gate NA1, the output of which is connected to inputs of the AND gates A45 to A48.

Figure 5:
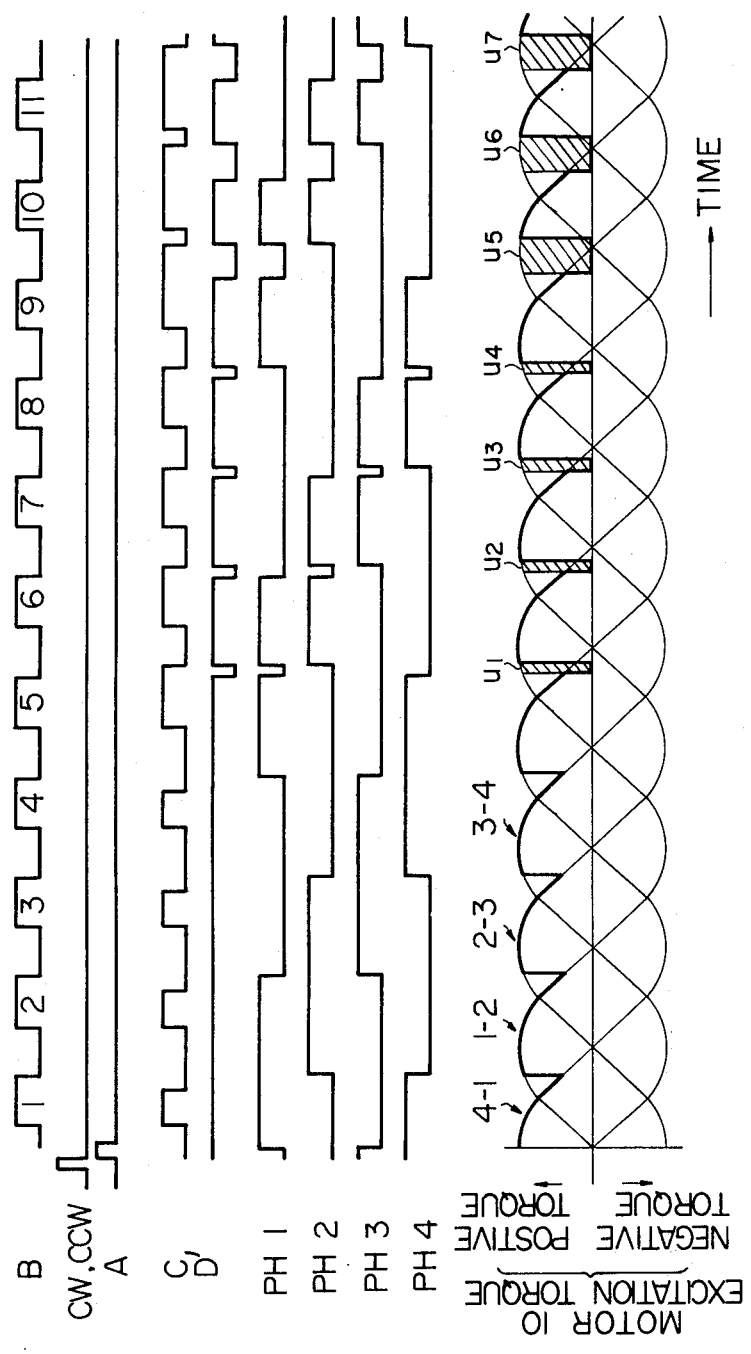
FIG. 5 is a timing chart of another embodiment of the present invention.

Referring now also to FIG. 5, it will be noted that whereas in the embodiments described with reference to FIGS. 2 to 4 the motor phase excitation sequence is changed backwards by one step during the time duration between the downclocks of the pulses B and C, in the embodiment of FIG. 6 the motor is shut off during this time duration to decelerate the motor shaft 14 to an even greater extent. In a manner similar to FIG. 2, a solid thick line represents the torque applied to the shaft 14 of the motor 10. The NAND gate NA1 performs a similar function to the AND gate A11 shown in FIG. 3 in that it operates to detect the time interval between the downclocks of the pulses B and C and alter the phase excitation of the motor 10 during this time duration. The output pulses D' of the NAND gate NA1 are identical to the pulses D produced by the AND gate A11 except that their polarity is inverted. As long as the pulses B are present or when neither of the pulses B and C are present, the NAND gate NA1 will produce a high output to enable the AND gates A45 to A48 to gate the 1 side outputs of the flip-flops F22 and F23 respectively to the motor 10 to excite the motor 10 in the normal phase excitation sequence. When, however, only the pulses C are present which occurs only when the duration of the pulses B is shorter than the duration of the pulses C, the NAND gate NA1 produces a low output to inhibit the AND gates A45 to A48. In this manner, no excitation is applied to the motor 10 during time durations designated by hatched areas u1 to u7 in FIG. 5. The durations u1 to u7 correspond to the 5th to 11th pulses B in a manner identical to that shown in FIG. 2.

Figure 8:
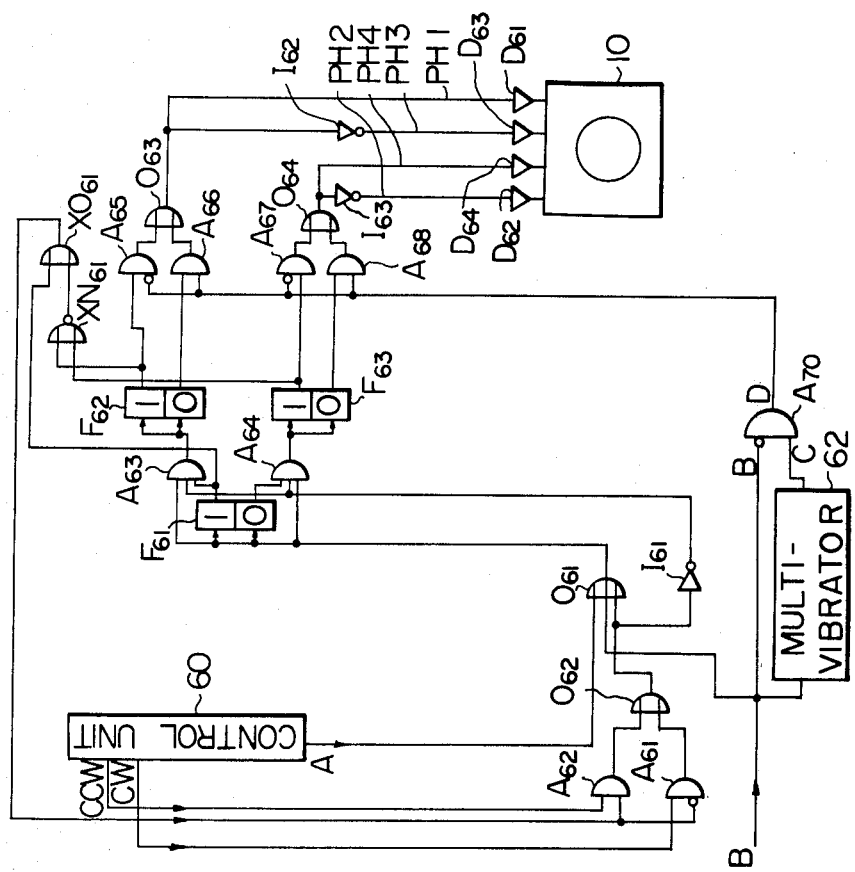
FIG. 8 is an electrical schematic diagram of a controller for producing the signals shown in FIG. 7.

Still another embodiment of the controller 26 designated as 66 is shown in FIG. 8, and comprises a control unit 60 having a start pulse A output connected to an input of an OR gate 061 and CW and CCW pulse outputs connected to inputs of AND gates A61 and A62 respectively. The outputs of the AND gates A61 and A62 are connected to inputs of an OR gate 062, the output of which is connected to another input of the OR gate 061. The output of the OR gate 061 is connected to trigger inputs of the 1 and 0 side stages of a flip-flop F61 and also to inputs of AND gates A63 and A64. The output of the OR gate 062 is connected through an inverter I61 to other inputs of the AND gates A63 and A64. The outputs of the 1 and 0 stages of the flip-flop F61 are connected to inputs of the AND gates A63 and A64 respectively. The outputs of the AND gates A63 and A64 are connected to trigger inputs of flip-flops F62 and F63 respectively. The 1 side outputs of the flip-flops F62 and F63 are connected to inputs of an exclusive NOR gate XN61, the output of which is connected to an input of an exclusive OR gate XO61. The 1 side output of the flip-flop F61 is connected to another input of the exclusive OR gate XO61, the output of which is connected to an input of the AND gate A62 and to an inverting input of the AND gate A61.

The 1 and 0 side outputs of the flip-flop F62 are connected to inputs of AND gates A65 and A66, the outputs of which are connected to inputs of an OR gate 063. The 1 and 0 side outputs of the flip-flop F63 are connected to inputs of AND gates A67 and A68, respectively, the outputs of which are connected to inputs of an OR gate 064. The output of the OR gate 063 is connected through the line PH1 and a driver D61 to the phase 1 input of the motor 10. The output of the OR gate 063 is also connected through an inverter I62, the line PH3 and a driver D63 to the phase 3 input of the motor 10.

The output of the OR gate 064 is connected through the line PH4 and a driver D64 to the phase 4 input of the motor 10. The output of the OR gate 064 is also connected through an inverter I63, the line PH2 and a driver D62 to the phase 2 input of the motor 10.

The pulses B are applied to inputs of the OR gate 061, a multivibrator 62 and an inverting input of an AND gate A70. The multivibrator produces the pulses C which are applied to an input of the AND gate A70. The AND gate A70 produces the pulses D in an identical manner to the AND gate A11 and feeds the same to inverting inputs of the AND gates A65 and A67 and to non-inverting inputs of the AND gates A66 in A68.

Figure 7:
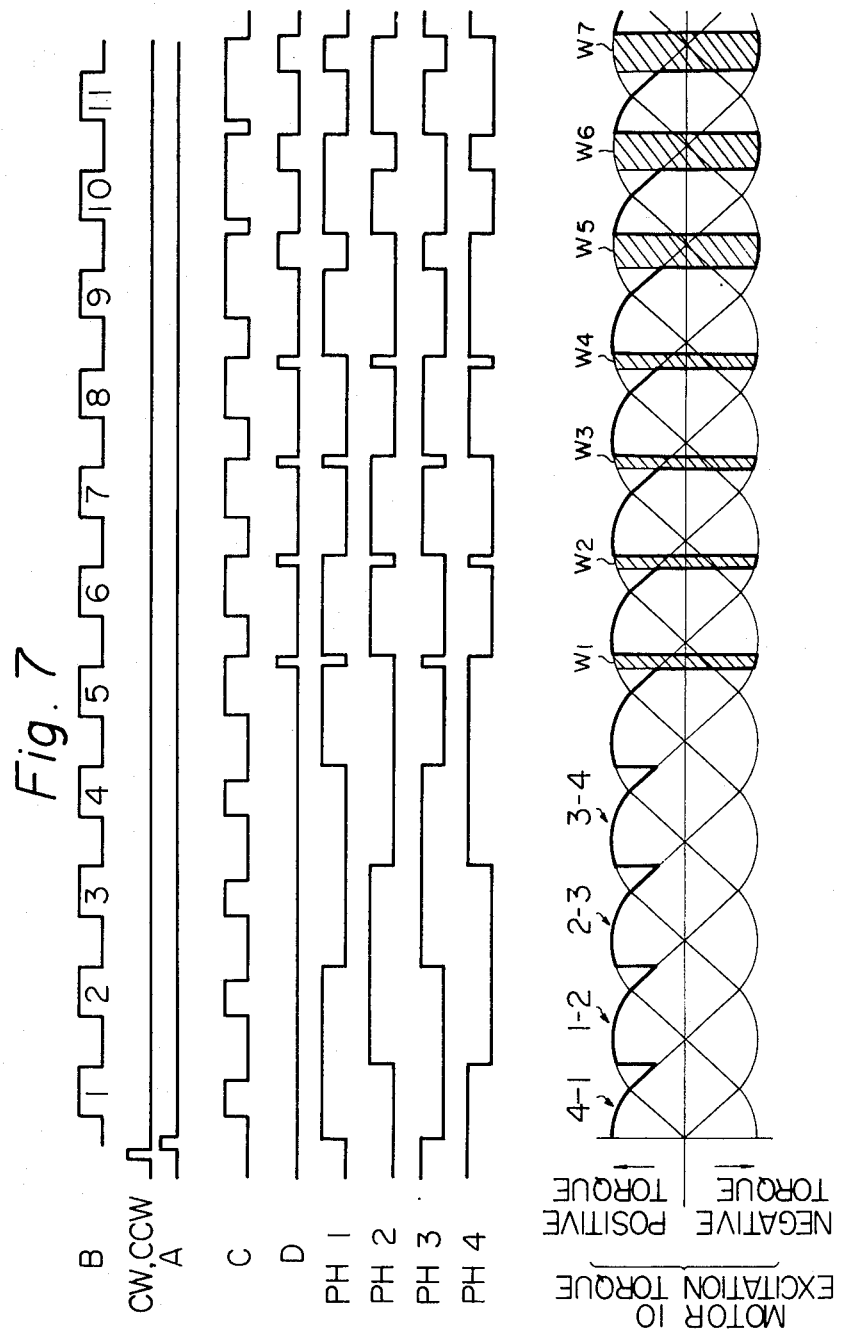
FIG. 7 is a timing chart of still another embodiment of the present invention.

During normal operation of the embodiment of FIG. 8, as is shown in FIG. 7, the output of the AND gate A70 is normally low to enable the AND gates A65 and A67 and inhibit the AND gates A66 and A68. The 1 side outputs of the flip-flops F62 and F63 are thereby gated through the AND gates A65 and A67 respectively to the motor 10 to excite the motor 10 in the normal phase excitation sequence. When, however, only the pulses C are present which occurs only when the pulses B are shorter in duration than the pulses C, the AND gate A70 will produce a high output to inhibit the AND gates A65 and A67 and enable the AND gates A66 and A68 so that the 0 side outputs of the flip-flops F62 and F63 are gated to the motor 10 through the AND gates A66 and A68. The 0 side outputs of the flip-flops F62 and F63 are of course of the opposite polarity from the 1 side outputs thereof, and the effect is to invert the excitation of all phases of the motor 10. As will be readily understood from the table included hereinabove, reversing all phases of the motor 10, which is a four phase motor, has the effect of taking two steps backward in the phase excitation sequence. The result is that reverse torque is applied to the motor shaft 14 during periods designated by hatched portions w1 to w7 in FIG. 7. This has an even greater effect in decelerating the motor shaft 14 to maintain the speed of the motor shaft 14 below the maximum permissible speed. Taking for example the operation which occurs between the downclock of the 5th pulse B and the downclock of the 5th pulse C, it will be seen that the normal phase excitation corresponding to the downclock of the 5th clock pulse is 1-2, and the flip-flops F62 and F63 produce 1 side outputs which are high and low respectively (refer to the table) to excite phases 1 and 2. However, the low 0 side output of the flip-flop F62 is gated through the AND gate A66 and inverted by the inverter I62 so that phase 3 is excited and phase 1 is inhibited. In a similar manner, the high 0 side output of the flip-flop F63 is gated through the AND gate A68 to excite phase 4 and inhibit phase 2. The resulting phases excited are therefore 3-4 which is two steps backward in the excitation sequence. The same effect is produced for all clockwise and counterclockwise combinations of phase excitations as can be deduced from studying the table.

Referring now to FIG. 9, the operation of the motor 10 as controlled in accordance with the present invention is presented in graphic form. The motor 10 is a stepping motor and is excited at a speed represented by the ordinate in thousands of pulses per second. The abscissa represents time.

The operation as controlled in a conventional manner is represented by curves K1, K1' and K1" which show the motor shaft 14 speed increasing rapidly to a high value and the variations in maximum speed at random caused by the variations in the load conditions of the motor, variations in the characteristics of the motor, etc. Curves K2 to K4 represent the same motor as controlled in accordance with the embodiments of the present invention. It will be noted that the maximum speed of the motor shaft 14 may be limited to any desirable speed as represented by the curves K2, K3 or K4 by varying the duration of the reference pulse C. The particular embodiment of the invention to be provided for a particular motor is therefore dependent on practical design conditions such as the motor shaft friction, the driving power, the load, etc.

While, in the illustrated embodiments, the pulse B has been shown and described as being a positive pulse, it may be noticed that the pulse B may be negative, if desired. Although the disc 18 has been shown and described as being formed with circumferentially equally spaced slots 18a, it is to be noted that the space between adjacent slots 18a may be unequally divided.

Further, it is to be noted that although the multivibrator 32 has been described as being triggered in response to the leading edge of the pulse B, the multivibrator 32 may be triggerred in response to the angular displacement of the motor shaft.

Many modifications to the present invention as shown and described will become possible for those skilled in the art after receiving the present teachings. The invention may be applied to any suitable type of pulsed motor and is not in any way limited to a four phase stepping motor which is shown in described herein for exemplary purposes only.

What is claimed is:

1. In a method of driving a multi-phase motor, the motor having excitation means to sequentially excite the motor phases to drive the motor and a pulse generator operatively connected with the motor shaft to generate a pulse representing a predetermined magnitude of angular displacement of the motor shaft whereby the pulse duration decreases as the motor shaft speed increases, the improvement of steps to control the excitation means to limit the motor shaft speed to a predetermined value, comprising:
   a. sensing the duration of the pulse; and
   b. controlling the excitation means to excite the motor phases in such a manner as to reduce the accelerating force on the motor shaft when the pulse duration is below a predetermined duration for a time duration equal to the difference between the pulse duration and the predetermined duration so that the motor shaft speed is substantially limited to the predetermined motor shaft speed value.

2. The method according to claim 1, in which step (b) comprises controlling the excitation means to alter the phase excitation sequence of the motor phases.

3. The method according to claim 1, in which step (b) comprises de-energizing the motor phases for the time duration.

4. The method according to claim 2, in which step (b) comprises controlling the phase excitation means to alter the excitation sequence of the motor phases so that a decelerating force is applied to the motor shaft.

5. The method according to claim 1, in which step (a) comprises sensing the generation of the pulse, generating a reference pulse for said predetermined duration in response to the sensed generation of the pulse, sensing the coincidence of the pulse and the reference pulse and generating and feeding to the phase excitation means an actuating pulse during a time duration in which only the reference pulse is present which is equal to said time duration.

6. The method according to claim 1, in which step (a) comprises sensing the generation of the pulse, generating a reference pulse for said predetermined duration in response to the sensed generation of the pulse, and in which step (b) comprises controlling the excitation means to change the phase excitation of the motor to the next phase in the sequence upon termination of whichever of the pulse and reference pulse has the longer duration.

7. In a multi-phase motor controller having excitation means to sequentially excite the motor phases to drive the motor and a pulse generator operatively connected to the motor shaft to generate a pulse representing a predetermined magnitude of angular displacement of the motor shaft whereby the pulse duration decreases as the motor shaft speed increases, the improvement adapted to control the excitation means to limit the motor shaft speed to a predetermined value, comprising:
   sensing means operative to sense the duration of the pulse; and
   control means responsive to the sensing means and operative to control the excitation means to excite the motor phases in such a manner as to reduce the accelerating force on the motor shaft when the pulse duration is below a predetermined duration for a time equal to the difference between the pulse duration and the predetermined duration so that the motor shaft speed is substantially limited to the predetermined motor shaft speed.

8. The controller according to claim 7, in which the control means is operative to control the excitation means to alter the phase excitation sequence of the motor phases.

9. The controller according to claim 7, in which the control means is operative to de-energize the motor phases for the time duration.

10. The controller according to claim 8, in which the control means is operative to control the excitation means to alter the phase excitation sequence of the motor phases so that a decelerating force is applied to the motor shaft.

11. The controller according to claim 7, in which the sensing means comprises a pulse generator responsive to the angular displacement of the motor shaft and operative to generate a reference pulse for said predetermined duration, the sensing means further comprising coincidence sensing means operative to sense the duration of coincidence of the pulse and the reference pulse, the coincidence sensing means actuating the control means to control the excitation means to excite the motor phases in such a manner as to reduce the accelerating force on the motor shaft when the sensed duration of coincidence is shorter than said predetermined duration of the reference pulse.

12. The controller according to claim 11, in which the pulse generator is triggered by the beginning of the pulse and operative to generate the reference pulse.

13. The controller according to claim 11, in which the coincidence sensing means is operative to control the excitation means to be triggered by the termination of the reference pulse when the pulse duration is shorter than the predetermined duration of the reference pulse.

14. The controller according to claim 13, in which the coincidence sensing comprises an OR gate means having inputs connected to receive the pulse and the reference pulse and an output connected to the excitation means.

15. The controller according to claim 11, in which the coincidence sensing means comprises an AND gate means having one input connected to receive the reference pulse and an inverting input connected to receive the pulse, the output of the AND gate means being connected to the excitation means so as to feed an actuating pulse to the excitation means to excite the motor phases in such a manner as to reduce the accelerating force on the motor shaft during a time interval when only the reference pulse is present.

* * * * *